Feb. 22, 1966 S. L. MERKEL 3,237,104
PASS OR FAIL TRANSISTOR TEST FOR INDICATING THE COMBINED
RESULT OF $BV_{CEO}$ AND SPURIOUS OSCILLATION TESTS
Filed March 5, 1962 2 Sheets-Sheet 1

*INVENTOR.*
STEPHEN L. MERKEL
BY
ATTY.

Feb. 22, 1966 S. L. MERKEL 3,237,104
PASS OR FAIL TRANSISTOR TEST FOR INDICATING THE COMBINED
RESULT OF $BV_{CEO}$ AND SPURIOUS OSCILLATION TESTS
Filed March 5, 1962 2 Sheets-Sheet 2

INVENTOR.
STEPHEN L. MERKEL
BY
ATTY.

United States Patent Office 3,237,104
Patented Feb. 22, 1966

3,237,104
PASS OR FAIL TRANSISTOR TESTER FOR INDICATING THE COMBINED RESULT OF $BV_{CEO}$ AND SPURIOUS OSCILLATION TESTS
Stephen L. Merkel, Cleveland, Ohio, assignor to Lorain Products Corporation, a corporation of Ohio
Filed Mar. 5, 1962, Ser. No. 177,475
6 Claims. (Cl. 324—158)

My invention relates to test equipment and is directed more particularly to transistor testers.

At the present state of the transistor art, particularly with respect to the manufacture of these semi-conductor devices, it has been found that considerable difficulty is experienced in maintaining uniformity of parameters throughout a group of these devices which are presented to the user as having the same characteristics.

Accordingly, when a group of transistors is received for incorporation into electrical equipment, all presumably having the same characteristics, it is found that while there is substantial degree of uniformity throughout the group, some will evidence parameter variations.

If these variations are found in parameters which are of particular importance to the operation of the equipment into which the transistors are to be incorporated, it will be seen that the overall quality of that equipment will be affected. It is therefore desirable to subject the group of transistors received to some type of examination or test to determine that there is uniformity, at least so far as the important parameter or parameters are concerned.

A very important transistor parameter is the breakdown voltage from emitter to collector with the base open, commonly designated $BV_{CEO}$. This is the emitter-collector voltage, when the base is open, at which the current begins to avalanche. When this occurs, the transistor is often rendered ineffective in the circuit for the purpose intended.

Consequently, in many circuits it is essential that the $BV_{CEO}$ of a given transistor be of a certain value to permit full utilization of the associated equipment without avalanche occurring.

One method of determining $BV_{CEO}$ at the present time is to apply a variable D.-C. voltage across the transistor from emitter to collector with the base open and observe the voltage at which the current begins to avalanche as the D.-C. supply is increased from zero. The principal disadvantage of such a method is the excessive power dissipation which may take place in the transistor during the test due to the continuous high current flow, and the resultant possible destruction of the transistor.

Another method sometimes used to determine the $BV_{CEO}$ of a given transistor is the observation of the characteristic curve on an oscilloscope or on a transistor curve tracer. Both of these devices are quite expensive, and both require the services of a relatively skilled operator.

Consequently, due to the high cost of the equipment and the expense of experienced operators, units such as those described above are generally not available to the average transistor user who has need of making an oscilloscope test such as that referred to above.

Accordingly, it is an important object of my invention to provide transistor testing equipment which may be manufactured economically and which may be utilized to determine the $BV_{CEO}$ of a transistor without subjecting the semi-conductor being tested to destructive power.

A further object of my invention is to provide a transistor testing unit which may be quickly, easily, and accurately used by an unskilled operator.

Another difficulty in subjecting a transistor to a $BV_{CEO}$ test is the fact that spurious oscillations in the $BV_{CEO}$ region of the characteristic curve may be present, yet, in the static test mentioned above, will not be accounted for. On the other hand, these oscillations have a direct bearing on the $BV_{CEO}$ evaluation of a transistor. Consequently under such conditions a transistor having these latent, spurious oscillations will give an inaccurate test result not truly indicative of the $BV_{CEO}$ characteristic curve. Thus it is desirable, in testing a transistor for $BV_{CEO}$, to provide circuitry which takes into account all related characteristics to present a single, accurate reading.

Accordingly, it is another object of my invention to provide a test circuit wherein a single reading represents an aggregate indication of a mulplicity of related transistor conditions in the transistor being tested.

Still another object of my invention is to provide circuitry for testing the $BV_{CEO}$ of a transistor in which spurious oscillations that might be present in the $BV_{CEO}$ regions are impressed upon a measuring element in opposition to pulses impressed on said measuring element for measuring the $BV_{CEO}$.

Another object of my invention is to provide test circuitry for transistors which is so arranged that different types of transistors may be tested even if the different types fall into distinctly different ranges.

Still another object of my invention is to provide a novel circuit wherein a change in the test circuit to accommodate a transistor of different power rating automatically recalibrates the meter circuit to accommodate the new testing conditions.

Still another object of my invention is to provide a transistor test circuit of the type referred to, having an improved oscillator arrangement whereby the advantages and improvements defined above may be realized.

More specifically, it is an object of my invention to provide improved circuitry which will operate from normal, commercial A.-C. power and which utilizes pulsating test power as distinguished from a constant test power, the pulses limiting the amount of energy to which the transistor is subjected during the test operation.

Another object of my invention is to provide test circuitry associated with meter circuitry whereby an unskilled operator, by means of a single reading, may accurately and reliably determine the $BV_{CEO}$ of a given transistor.

Other objects and advantages of my invention will become apparent from the following description and accompanying drawings in which.

While a circuit embodying my invention is here described in conjunction with P-N-P transistor being tested, it will be understood by those skilled in the art that my invention may be adapted to N-P-N transistors by merely reversing the polarity of the various components shown and described herein.

Generally speaking, a transistor tester constructed in accordance with my invention includes circuit sections which comprise an A.-C. input section, a rectifying section, a test section, a calibrating section and a metering section.

Figure 1:
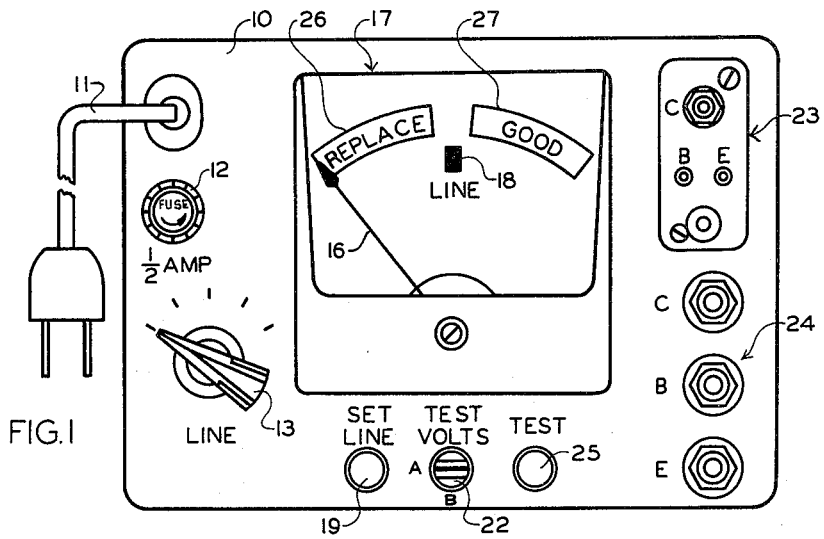
FIG. 1 is a plan view of a typical meter panel of my transistor tester.
Figure 2:
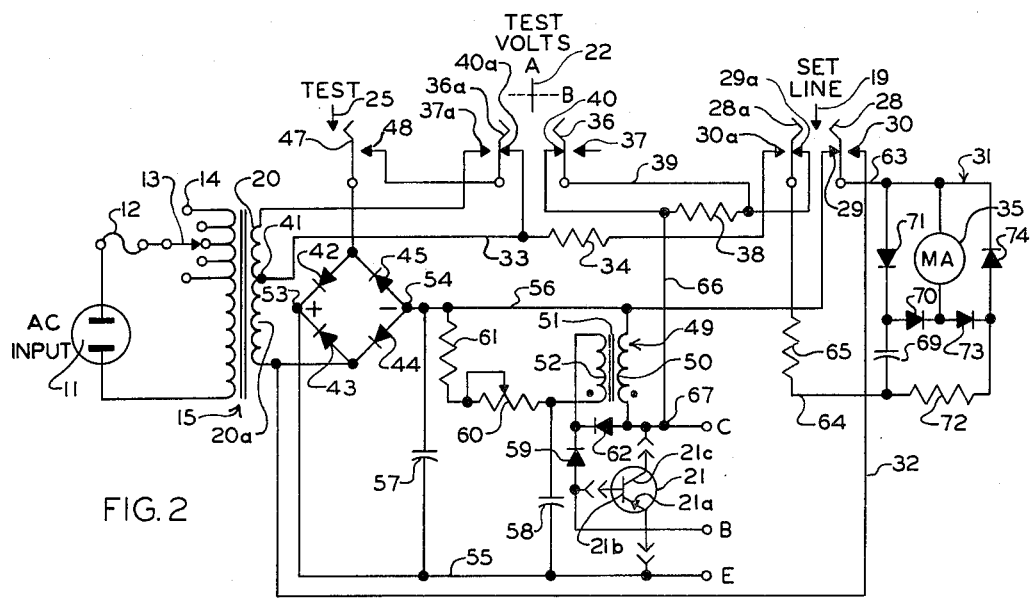
FIG. 2 is a schematic diagram of the circuitry utilizing my invention.

Referring to FIG. 1, it will be seen that the panel 10 of my transistor tester includes suitable A.-C. input means 11, input fuse 12 and a "line" switch 13. As shown in FIG. 2, the "line" switch 13 has a contact which engages taps 14 of the primary of an input transformer 15. By manipulation of switch 13 on the panel, the tester can be accommodated to different line voltages encountered from time to time. This operation is accomplished by rotating the switch 13 until the pointer 16 of the dial assembly 17 overlies the area 18 defined on the face of the meter 17. During this adjustment to line voltage it is necessary that the "set line" key 19 be depressed as will be more fully explained presently.

The above adjustment having been made, the operator is assured that a predetermined voltage is applied to the secondary 20 of the transformer 15 for test purposes, regardless of the particular value of the commercial A.-C. input used at the time the test is being made. Once the above adjustment to line voltage has been made, the "set line" key 19 is released and is not again operated during the test operation. The transistor to be tested is shown at 21 in the schematic diagram of FIG. 2 and is readily and easily connected into the circuit.

The particular embodiment of my invention shown herein is arranged so that transistors in two distinct voltage ranges may be tested. Adjustment of the circuit to one or the other of these ranges, depending upon the operating range of the transistor 21, is accomplished by setting the "test volts" key 22 to either position A or to position B shown in both FIGS. 1 and 2. It will be understood that more than two voltage ranges may be accommodated if desired.

The transistor 21 to be inserted in the circuit as shown in FIG. 2 may be connected either to the receptacle 23 which is designed to accept the standard configuration of power transistor pins or to terminals 24 if a transistor having other lead configurations is being tested. It is the practice to utilize clip cords when connecting the electrode leads to terminals 24. In both sets of terminals the receptacles are clearly identified as being for collector, base, and emitter.

The transistor having been inserted in the circuit, it is now merely necessary for the operator to depress the "test" key 25. This completes the test circuit as will presently be more fully described and, depending upon the characteristic of the transistor being tested, the pointer 16 will fall somewhere between the left hand end of the "replace" block 26 and the right hand end of the "good" block 27. The area immediately above the line block 18, between the "replace" and "good" blocks on the meter dial represents questionable test results under which circumstances the judgment of the operator determines, by the use to which the transistor is to be put, whether it is to be accepted or rejected.

Referring to FIG. 2 where an exemplary arrangement of a circuit utilizing my invention is shown, the components and operation will now be described.

The secondary winding 20 of input transformer 15 has impressed upon it a predetermined A.-C. voltage which has been set by operation of the "line" adjustment switch 13 as previously described.

As explained, operation of the circuit for test purposes depends first on the proper position of the "test volts" key 22 and subsequent depression of the "test" key 25 after the transistor to be tested has been incorporated into the circuit. The "test" key 25 together with the "set line" key 19 is arranged to make or break contacts in the circuit whereby the circuit is conditioned for line adjustment ("set line" key 19) and transistor voltage range ("test volts" key 22).

The "set line" key assembly is provided with spring contact arms 28 and 28a. When the key is in released position the arms 28 and 28a engage contactors 29 and 29a respectively and under these circumstances, the meter section is incorporated into the circuit for test purposes. When the "set line" key 19 is depressed, the spring arms 28 and 28a are moved away from one another thereby engaging contacts 30 and 30a. Under these circumstances the meter circuit 31 is connected across the secondary winding section 20a of the input transformer 15 through leads 32 and 33 respectively, resistor 34 being connected in the lead 33. For "set line" conditions the arrangement of the meter section, as will be explained presently, permits only half cycles of A.-C. current from winding section 20a to pass through a meter in that circuit.

From the foregoing, it will be seen that the depression of the "set line" key 19 connects the meter circuit 31 directly to the secondary winding section 20a whereby the meter 35 may be used to directly read the voltage impressed on the secondary winding section 20a during line adjusting operation of the "line" switch 13 as described above.

The "test volts" key 22 may be turned to position A or B as described above. In position B, spring contact arms 36 and 36a spread apart to engage contacts 37 and 37a, under which circumstances a resistor 38 is incorporated into the circuit. Simultaneously, by engagement of contact 37a and spring arm 36a, the entire secondary winding 20 is utilized in the circuit.

When the "test volts" key 22 is rotated to position A, the spring arms 36 and 36a engage contacts 40 and 40a. Under these circumstances, the circuit includes lead 33 directed to a tap on the secondary winding as shown at 41. Simultaneously, the resistor 38 is removed from the circuit by shunt 39.

From the foregoing, it will be seen that when the "test volts" key 22 is in position B, the entire secondary winding 20 is in the circuit. This conditions the circuit for testing a transistor of a higher voltage range and the resistor 38 is incorporated in the circuit for calibrating the meter section 31 to this higher voltage. On the other hand, when contacts 40 and 40a are engaged by the spring contacts 36 and 36a, only the lower voltage, secondary section 20a is incorporated in the circuit, thereby accommodating a transistor having lower voltage range. Also, the calibrating resistor 38 is shunted out of the circuit to condition the meter for this lower voltage condition.

Accordingly, it will be seen that I have provided a novel arrangement for adjusting the input to a multiplicity of transistor voltage ranges and simultaneously, with this adjustment, the meter circuit is automatically calibrated to the voltage condition obtained by the adjustment.

The input circuit including the secondary winding 20 of input transformer 15 is completed by the provision of a rectifier including diodes 42, 43, 44 and 45. For purposes of explanation, it will be assumed that the "test volts" key 22 has been moved to position A, namely, that which conditions the circuit for testing transistors in a lower voltage range. Also, for the purpose of explanation, it will be assumed that the "test" key 25 is in a depressed condition whereby the spring contact arm 47 is engaged with contact 48, thereby completing the circuit for testing purposes. It will be understood that it is only necessary to depress the "test" key 25 for a period of time of sufficient duration for the operator to observe the final position of the meter pointer 16.

When the circuit is energized, with transistor 21 in the indicated position, by depression of "test" key 25, it will be seen that the tap 41 of the winding 20 is connected through lead 33, contact 40a, spring contact arm 36a, contact 48, and spring contact arm 47, to an A.-C. terminal of the rectifier. The lower end of winding 20 is connected to the other A.-C. terminal of the rectifier to complete the A.-C. supply thereto.

The test section of my circuit includes a novel oscillator arrangement comprising the transistor to be tested and a pulse transformer 49 having a primary winding 50, which, as will be seen, serves as pulse responsive means or pulsing means for the meter circuit. The pulse responsive means is thus controlled by the transistor under test so that the pulses reflect the characteristics thereof. The secondary winding of the pulse transformer is shown at 52. The positive pole 53 of the rectifier is connected to the negative pole 54 by means of the lead 55, the emitter-collector path of the transistor 21 which is being tested, the primary winding 50 of the oscillator 49 and the lead 56.

To the end that the rectified, A.-C. source power is adequately filtered, a capacitor 57 is connected across the terminals 53 and 54 of the rectifier.

As power is applied to the circuit and current flows from D.-C. terminal 53 through the transistor 21 under test and through primary winding 50 to D.-C. terminal 54, an induced voltage is impressed on the secondary winding 52 of the oscillator transformer 49, this condition being maintained as long as a timing capacitor 58, connected between terminal 53 and the lower end of winding 52, will accept a charge. During this charging interval the transistor being tested is forward biased in that there is current flow through the emitter 21a and base 21b thereof, through diode 59 and secondary winding 52 of the oscillator into the capacitor 58. During this period, part of the emitter-collector current through the transistor flows through diode 62 and, with emitter-base current, flows through winding 52 to charge the capacitor.

Preferably, the diode 62 has less forward voltage drop than that of diode 59 whereby the collector 21c of the transistor 21 is maintained more negative than the base 21b thereof. This arrangement prevents the transistor from saturating and under these circumstances operation of the entire circuit is found to be improved.

The foregoing action continues until the capacitor 58 becomes fully charged at which time current flow through the secondary 52 ceases. When this occurs, the forward bias, emitter to base current ceases and the transistor shuts off, resulting in sharp reduction of current flow from the collector 21c to negative terminal 54 of the rectifier through primary winding 50 of the oscillator. The emitter to collector current flow does not decrease to zero, however, because of the emitter to collector leakage as will be explained presently.

The resultant collapse of the field of the pulse transformer 49 reverses polarity of windings 50 and 52 and capacitor 58 discharges through variable resistor 60 and timing resistor 61 to the negative terminal 54 of the rectifier. Any suitable timing resisitor configuration may be utilized, however, in the present embodiment I show the resistor 61 as fixed while the adjustable resistor 60 may be operated to adjust the R-C time constant of the test circuit.

Collapse of the magnetic field of the pulse transformer 49 induces a potential on the primary 50 which is series aiding in the D.-C. supply circuit and thus tends to maintain flow through the primary and the transistor emitter-collector path. The amount of current maintained through the transistor is determined by the emitter to collector leakage and the emitter-collector voltage which is the sum of the D.-C. supply and the potential induced on winding 50. The energy dissipated in the transistor by emitter-collector leakage current subtracts from the energy which has been stored in the magnetic field of winding 50, thereby limiting the energy and voltage which appear across winding 50 due to the collapsing magnetic field. It will be seen that upon collapse of the magnetic field of the pulse transformer 49, the voltage across the winding 50 is the difference between the D.-C. source voltage across terminals 53 and 54, for example 30 volts, and the $BV_{CEO}$ of the transistor being tested which may, for example, be 40 volts. The magnitude and shape of the voltage pulse which appear on winding 50 when the transistor shuts off, and which are determining factors in the evaluation of a transistor are due to the specific $BV_{CEO}$ characteristic curve such as shown at 77 in FIG. 5.

When the timing capacitor 58 is completely discharged to the negative terminal 54 of the rectifier through variable resistor 60 and timing resistor 61, the cycle of operation starts anew by virtue of the fact that the base 21b is biased negative to start emitter-collector conduction.

While the timing capacitor 58 is discharging, diode 59 prevents the capacitor voltage from being applied to the base 21b of transistor 21, thus maintaining the base open which, as already explained, is one of the conditions of test to ascertain $BV_{CEO}$.

Figure 3:
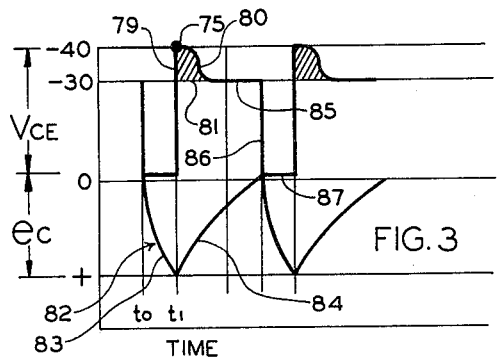
FIG. 3 is a curve of the voltage from emitter to collector with a satisfactory transistor under test.

The circuitry of my device is completed by the provision of the meter circuit 31. Assuming again that the "test volts" key 22 is in position A and the "set line" key 19 is in the released position shown in FIG. 2, it will be seen that the meter circuit 31 including the meter 35 is connected through lead 63, resilient contact arm 28, and contact 29 to the upper end of primary winding 50 of transformer 49. The other side of the meter circuit is connected through lead 64, series resistor 65, resilient contact arm 28a, contact 29a, lead 39, resilient contact arm 36, contact 40, and lead 66 to the collector of the transistor being tested as shown at the junction 67. Thus, effectively, the meter circuit is connected across the winding 50 of pulse transformer 49 and as pulses of like polarity such as the shaded areas in FIG. 3 are thus generated, the meter 35 is energized and the pointer is moved in accordance with average magnitude of the volt-time integral of the pulses. These pulses are the principal energy, the magnitude of which is impressed on the meter, to evaluate the $BV_{CEO}$ of a transistor being tested. As such, they may be termed the main pulses or induced pulses generated in the testing circuit.

Figure 4:
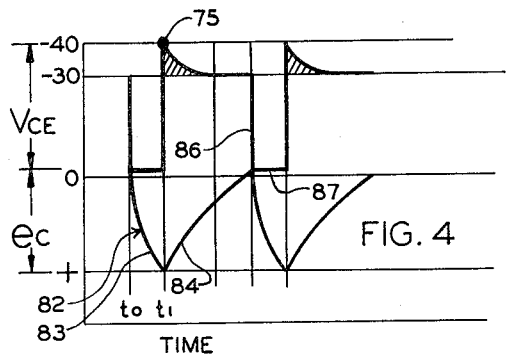
FIG. 4 is a curve of the voltage from emitter to collector with an unsatisfactory transistor under test.

Consequently, it will be seen that the meter reading takes into account not only the voltage value of the $BV_{CEO}$ as shown at 75 but also reflects, by recording the volt-time integral, the shape of the $BV_{CEO}$ characteristic curve as shown at 77. This shape, in turn, is determinative of the magnitude of the volt-time energy. This is shown clearly by comparison of FIGS. 3 and 4. FIG. 4 shows clearly the reduction of the volt-time integral which is experienced by an unsatisfactory $BV_{CEO}$ characteristic as shown at 78 in FIG. 6. The $BV_{CEO}$ curve of FIG. 6 is the result of excessive collector-base leakage.

Figure 5:
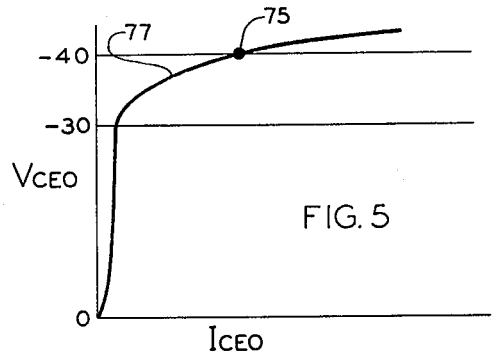
FIG. 5 is a $BV_{CEO}$ characteristic curve for the transistor of FIG. 3.

For further explanation of the test operation, FIG. 3 shows the emitter to collector voltage waveshape and the resulting volt-time integral pulse for a transistor having a low collector-base leakage thus producing a $BV_{CEO}$ characteristic curve such as that shown at 77 in FIG. 5. It will be seen that the shaded area defined by a rise in emitter to collector voltage at 79, the decay in voltage across the winding 50 as its field collapses shown at 80, and the source voltage level at 81, represents the energy which appears across the primary winding 50 during this collapse of its magnetic field. The volt-time integral is of course, modified by any spurious oscillations present in the transistor 21. If the $BV_{CEO}$ of the transistor is high, the voltage across the winding 50 will be greater while, if the $BV_{CEO}$ is lower, the volt-time integral and thus the energy of the pulses will be reduced. Thus, the shaded area of FIG. 3 will be reduced resulting in a lower position of the meter pointer 16.

Figure 6:
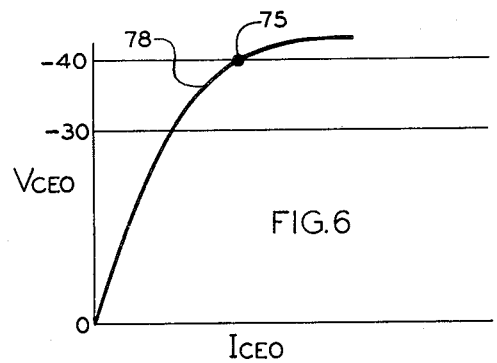
FIG. 6 is a $BV_{CEO}$ characteristic curve for the transistor of FIG. 4.

FIG. 4 shows the waveshape obtained from emitter to collector of a transistor being tested where the transistor has a higher collector-base leakage than the transistor of FIG. 3 and has a $BV_{CEO}$ characteristic curve as shown at 78 in FIG. 6. The transistor that produces the waveshape of FIG. 4 has the same $BV_{CEO}$ point as the transistor that produces the waveshape of FIG. 3. It will be noted, however, that the shaded area between $t_1$ and $t_2$ is much greater for the transistor having the $BV_{CEO}$ curve of FIG. 5 than the transistor which has the curve of FIG. 6.

Since the shaded areas in FIGS. 3 and 4 represent the energy which is delivered in each case to the meter circuit by the voltage across the primary 50, the transistor having the $BV_{CEO}$ curve of FIG. 6 will be rejected even though its $BV_{CEO}$ value is the same as that of the transistor with a $BV_{CEO}$ curve shown at 77 in FIG. 5. In other words, if the $BV_{CEO}$ curve has an unsatisfactory shape, the transistor will be rejected by the use of my invention in spite of its satisfactory $BV_{CEO}$ point.

In the case of the transistor used in the test resulting in FIGS. 4 and 6, the pointer 16, due to the low volt-time integral shown by the shaded area, will come to rest in the "replace" block 26 while during the test of FIGS. 3 and 5 it will come to rest in the "good" block 27.

It will be understood, of course, that a "replace" reading will also be obtained with a transistor having satisfactory collector to base leakage, yet, which has a low $BV_{CEO}$. In this case also, pulses having reduced volt-time integral will be generated with the result that the pointer 16 will give this "replace" reading.

Referring again to FIGS. 3 and 4, the curve shown generally at 82 represents the charge and discharge activity of the timing capacitor 58. It will be seen that the charge path of the timing capacitor is shown by the section 83 in the time interval from $t_0$ to $t_1$. At $t_1$ the capacitor is fully charged and at this time emitter to base current flow ceases causing the transistor under test to shut off. As shown at section 84, the capacitor now completely discharges during which time the emitter-collector voltage drops to the value of the D.-C. source voltage as shown by section 85. At the point of complete discharge, the emitter-collector voltage drops sharply as shown by 86 to a very low value as shown at 87 and remains at this value until the capacitor again becomes fully charged. At this point the cycle is repeated. It is these repetitious cycles and the resulting repetition of volt-time integral pulses that are impressed upon the meter 35 and registered by the pointer 16. It will be understood, of course, that the same sequence occurs in the test of a transistor having the characteristics resulting in the volt-time integral show nin FIG. 4.

Figure 7:
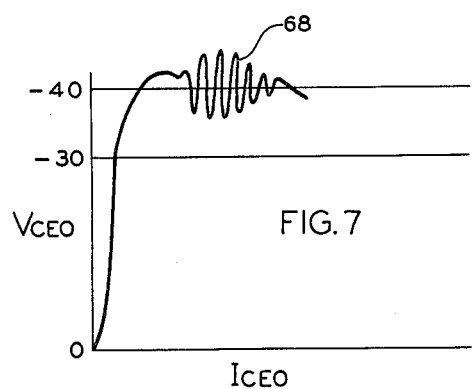
FIG. 7 is a $BV_{CEO}$ characteristic curve showing spurious oscillation in the $BV_{CEO}$ as referred to above.

As indicated previously, it is not uncommon that spurious oscillations occur in the $BV_{CEO}$ region of the transistor as shown at 68 in FIG. 7. Transistors which exhibit these spurious oscillations are not satisfactory and should be rejected. My invention takes this into account and rejects such transistors.

To the end that these spurious oscillations cause rejection, I have provided a capacitor 69 and a diode 70 through which the positive going portions of the spurious oscillations of polarity opposite the induced pulses described above may pass. The diode 70 is poled to afford current flow to the lower side of the meter 35. Thus the above portion of the spurious oscillations affect the meter reading basically controlled by the energy in the main or induced pulses and as modified by the spurious oscillations. The volt-time energy of the pulses in the breakdown region shown by the shaded areas in FIG. 3 will be impressed upon the meter 35 from the upper end of the winding 50 through lead 63. The energy of the spurious oscillations, when present in the winding 50, having opposite going portions, will pass from the bottom of the winding 50 through the lead 64, capacitor 69 and diode 70 to the meter 35 to oppose the volt-time energy of the main pulses. Thus, the energy of the collapsing field of winding 50 will drive the pointer 16 to the right in FIG. 1 while spurious oscillations will drive it to the left. It is therefore the aggregate or summation of these factors which result in the single meter reading that takes into account $BV_{CEO}$ capabilities of the transistor and also these spurious oscillations.

Those portions of the spurious oscillations of polarity opposite to that of the D.-C. pulses through the diode 70 as explained above. To the end that the portions thereof having like polarity to the D.-C. pulses pass through lead 63 and diode 71 to relieve capacitor 69 of its charge and to the end that the portions of opposite polarity pass through diode 70, a resistor 72 is provided in the meter circuit.

From the foregoing it will be seen that the capacitor 69 will block the relatively low frequency, main or induced pulses by means of which the $BV_{CEO}$ is measured thus directing them through the meter 35, yet will offer low impedance to the spurious oscillations of high frequency permitting those portions which deduct from the meter reading to pass through the meter by way of diode 70 while diverting by way of diode 71, those which would add to the meter reading.

A diode 73 is inserted in the meter circuit to pass meter current from the lower end of the meter 35 through the resistor 72 and lead 64 back to the junction 67 at the lower end of winding 50 of the oscillator transformer 49. A diode 74 is provided to pass pulses of the opposite polarity to those of the induced voltage being measured.

Accordingly, it will be seen that I have provided means whereby the main or induced voltage which indicates the $BV_{CEO}$ of the transistor being tested is opposed by any spurious oscillations present with the result that a single pointer position is obtained which takes into account both the $BV_{CEO}$ and the presence of spurious oscillations. In the event that the spurious oscillations are not present in the transistor being tested, capacitor 69 and diode 70 will not be effective and my circuit will operate to give the desired reading.

It will be seen that I have provided circuitry whereby the useful measure of a transistor being tested is accurately reflected in the position attained by the meter pointer 16. This is accomplished by the measurement of the energy across primary winding 50 while the magnetic field thereof is collapsing. So long as the "test" key 25 is depressed, the pulse energy will be impressed on the meter circuit and the position of the pointer 16 will reflect the average value of the pulses. From the previous explanation, it will be seen that the sum of the D.-C. supply voltage as represented across points 53 and 54 and the voltage induced on the primary winding 50 is applied across the transistor from emitter to collector. The voltage induced on primary 50 is limited by the $BV_{CEO}$ of the transistor under test. This voltage that appears across primary 50, in turn, determines the amount of current and therefore the energy which is delivered to the meter circuit. Therefore, as explained previously, the meter 35 indicates the difference between $BV_{CEO}$ and source voltage as modified by spurious oscillations present in the transistor. Thus, there is obtained a highly selective reading which will indicate whether or not the transistor being tested will serve for the purpose intended.

What I claim is:

1. The combination in a transistor tester of an input circuit section, a test circuit section, and a meter circuit section including a meter, said input circuit section including an input transformer and a rectifier supplied by said transformer, said rectifier having D.-C. terminals, means for connecting said test circuit section across the D.-C. terminals of said rectifier section; said test circuit section including means to connect the emitter, collector and base electrodes of the transistor being tested into the circuit, a pulse transformer having primary and secondary windings, a timing capacitor and a timing resistor, means for serially connecting the emitter-collector circuit of the transistor and the primary winding of said pulse transformer between said D.-C. terminals of said rectifier, a diode means for serially connecting said diode and said secondary winding of said pulse transformer between the base of the transistor being tested and said timing capacitor, said diode being poled to prevent reverse bias from being supplied from said secondary winding to said base, means for connecting one side of said timing capacitor to one D.-C. terminal of said rectifier and means for connecting the other side thereof to the other D.-C. terminal of said rectifier through said timing resistor; means for connecting said primary winding of said pulse transformer across said meter circuit section, said meter circuit section being adapted to indicate the energy in the primary winding of said pulse transformer during collapse of the field thereof upon completion of the charge on said capacitor.

2. In a transistor tester, in combination, means for supplying D.-C. testing power, a test circuit including a pulse transformer having primary and secondary windings, a timing capacitor and a timing resistor serially connected across the D.-C. output of said means for supplying D.-C. testing power, a metering circuit including a metering element, means for connecting said metering circuit across the primary winding of said pulse transformer, means for connecting a transistor being tested into said test circuit whereby the emitter-collector circuit of said transistor is established in series with the primary winding of said pulse transformer across the D.-C. output of said means for supplying D.-C. testing power and whereby the base of said transistor is connected, with one other electrode of said transistor, in series with the secondary of said pulse transformer between one D.-C. terminal of said D.-C. power supply and said timing resistor, first unidirectional means between said base electrode and said pulse transformer secondary, said first unidirectional means being poled to prevent reverse bias voltage from being supplied from said secondary to said base whereby said base is isolated from said timing capacitor during the discharge thereof and second unidirectional means in said meter circuit arranged to pass current resulting from the collapse of the magnetic field of said primary through said metering element when said capacitor becomes charged.

3. The combination in a transistor tester of an input circuit section, a test circuit section, and a meter circuit section including a meter, said input circuit section including an input transformer and a rectifier supplied by said transformer, said rectifier having D.-C. terminals, means for connecting said test circuit section across the D.-C. terminals of said rectifier section; said test circuit section including means to connect the emitter, collector and base electrodes of the transistor being tested into the circuit, a pulse transformer having primary and secondary windings, a timing capacitor and a timing resistor, means for serially connecting the emitter-collector circuit of the transistor and the primary winding of said pulse transformer between said D.-C. terminals of said rectifier, a diode, means for serially connecting said diode and said secondary winding of said pulse transformer between the base of the transistor being tested and said timing capacitor, said diode being poled to block current flow from said secondary winding to said base, means for connecting one side of said timing capacitor to one D.-C. terminal of said rectifier and means for connecting the other side thereof to the other D.-C. terminal of said rectifier through said timing resistor; means for connecting one end of said meter to one end of said primary winding, first unidirectional conducting means and resistive means serially connected between the other end of said meter and the other end of said primary winding, said first unidirectional conducting means being poled to pass current resulting from the collapse of the magnetic field of said primary winding through said meter when the transistor being tested ceases to conduct, second unidirectional conducting means connected from said one end of said meter to a point between said first unidirectional conducting means and said resistive means, said second unidirectional conducting means being poled to shunt current produced by the voltage on said primary winding around said meter when the transistor being tested is rendered conducting, third unidirectional conducting means and capacitive means serially connected between said other end of said meter and said other end of said primary winding to pass portions of spurious oscillations through said meter in opposition to the current produced by said collapse of the magnetic field, fourth unidirectional conducting means connected from said one end of said meter to a point between said third unidirectional conducting means and said capacitive means to shunt undesirable portions of spurious oscillations around the meter.

4. The combination in a transistor tester adapted to be operated from a D.-C. source of first circuit means for periodically applying a D.-C. voltage pulse across the emitter-collector circuit of a transistor under test, said first circuit means including a transformer having a primary and a secondary winding, said primary winding being serially connected with the emitter-collector circuit of the transistor across the D.-C. source, second circuit means for applying a forward bias voltage to the base of said transistor only in the interim between the D.-C. pulses and including said transformer secondary winding connected between the base of the transistor and a timing circuit, said timing circuit including a serially connected resistor and capacitive means across the D.-C. source, third circuit means including first unidirectional means connected between said transformer secondary winding and the base of the transistor for maintaining the base of said transistor open circuited concurrently with each D.-C. pulse being so applied to the transistor, fourth circuit means for measuring that portion of the energy of the D.-C. pulses which appears across said first circuit means, fifth circuit means connected to said transformer primary winding for detecting spurious oscillations in the transistor, said fifth circuit means including second unidirectional means and means for blocking said D.-C. pulses and passing said spurious oscillations, means for connecting said second unidirectional means to said fourth circuit means whereby the energy of said spurious oscillations is directed in opposition to said D.-C. pulses in the said fourth circuit means whereby said fourth circuit means measures the combined energy of the D.-C. pulses and the portions of spurious oscillations of opposite polarity thereto.

5. The combination in a transistor tester for determining the $BV_{CEO}$ characteristic of a transistor as modified by any spurious oscillations therein and adapted to operate from a D.-C. source, of first circuit means for periodically applying a D.-C. voltage pulse across the emitter-collector circuit of a transistor under test, said first circuit means including a transformer having a primary and a secondary winding, said primary winding being serially connected with the emitter-collector circuit of the transistor across the D.-C. source, second circuit means for applying a forward bias voltage to the base of said transistor only during the interim between the D.-C. pulses and including said transformer secondary winding connected between the base of the transistor and a timing circuit, said timing circuit including a serially connected resistor and first capacitive means across the D.-C. source, third circuit means including first unidirectional means connected between said transformer secondary winding and the base of the transistor for maintaining the base of said transistor open circuited concurrently with each D.-C. pulse being so applied to the transistor, fourth circuit means for measuring the magnitude of said D.-C. pulses as modified by spurious oscillations in the transistor being tested and including a metering element, second unidirectional means poled to pass D.-C. pulses of a first polarity to said metering element, fifth circuit means for detecting spurious oscillations in the transistor including third unidirectional means and second capacitive means serially connected across said second unidirectional means to pass those portions of spurious oscillations having a second polarity through said metering element in a direction opposed to that of said D.-C. pulses.

6. In a transistor tester of the type adapted to measure D.-C. pulses formed by a transistor to be tested, in combination, a pulsating D.-C. source, a metering circuit section and a test circuit section, said test circuit section including the transistor to be tested, inductive means serially connected with the emitter-collector circuit of said transistor across said pulsating D.-C. source, a timing circuit including first capacitive means and resistive means, means for connecting the base of said transistor and one other electrode thereof across said D.-C. source through said resistive means, means for connecting said capacitive means across said D.-C. source through said resistive means, said metering circuit section including a metering element and first unidirectional means poled to pass pulses of a first polarity to said metering element from said inductive means, circuit means for detecting the presence of spurious oscillations in the transistor and including a second unidirectional means and second capacitive means serially connected across said first unidirectional means to pass those portions of spurious oscillations having a second polarity through said metering element in a direction opposed to that of said D.-C. pulses.

References Cited by the Examiner
UNITED STATES PATENTS

| | | | |
|---|---|---|---|
| 2,743,907 | 5/1956 | Christensen et al. | 331—71 |
| 2,939,067 | 5/1960 | Wouk | 324—119 X |
| 3,054,954 | 9/1962 | Boscia et al. | 324—158 |
| 3,134,944 | 5/1964 | Newman | 324—158 |

OTHER REFERENCES

General Electric Controlled Rectifier Manual, 1960, pp. 198–199.

Motorola Power Transistor Manual, 1961, pp. 159–160.

WALTER L. CARLSON, *Primary Examiner.*

E. L. STOLARUN, *Assistant Examiner.*